July 20, 1965     D. H. BROOK     3,195,599

SELF-LOCKING SAFETY BOLT

Filed July 15, 1963

INVENTOR
David H. Brook

BY Thomas, Weisman & Russell

ATTORNEYS

United States Patent Office 3,195,599
Patented July 20, 1965

3,195,599
SELF-LOCKING SAFETY BOLT
David H. Brook, 2037-A Texas Ave., San Antonio, Tex.
Filed July 15, 1963, Ser. No. 294,827
8 Claims. (Cl. 151—7)

This invention relates to an improved, self-locking nut and bolt combination; and more specifically to a channeled bolt and resilient insert therefor so designed as to lock a regular nut into any desired position on a threaded bolt shank.

Self-locking nut and bolt devices are well known in the art. Certain of these combinations employ various types of semi-hollow and channeled bolt shafts into which are driven metal wedges or malleable sections of metal washers and nuts after the nut has been tightened to its proper position. Many of these implements have proved unfavorable in work requiring a great deal of precision, since the nut or washer usually had the locking device fixedly attached to only one point on its circumference, thus necessitating turning the nut further than desired at times in order to align the locking device with the bolt channel.

Improvements on these types of locknuts and washers were of the types wherein inserts of materials softer than the nut and bolt were placed in various shaped bolt channels so that the attaching of a nut to the bolt had the effect of creating either temporary or permanent threads on the insert, which threads, in one manner or another, served to lock the nut in a more or less stationary position on the bolt. This type of instrument made possible the locking of the nut at any position on the bolt and also enabled the utilization of the standard nut, thereby obviating the expense of producing special securing nuts and washers. The insert to which reference has been made is usually shaped in such a manner as to correspond with the shape of the channel or groove in the bolt shank, thereby allowing a tight fit when the nut is fully affixed. Correspondingly, it has been taught that the bolt channels or grooves, themselves, may assume a variety of shapes. Referring to the bolt as being in an upright position in which the head is lower and the shank upper, the art shows that the channel may be wedge-shaped with the apex directed downwardly; may have both longitudinally and horizontally inclined bottoms and/or sides; may traverse the whole diameter of the shaft or part of the diameter; may be two-sectioned with one groove proceeding longitudinally down one side of the shaft and the other groove down the opposite side so that a section of the shaft is interposed between them, and so forth.

While the particular manifestations of channeled bolts have improved the art of securing nuts to bolts, there remain, nonetheless, a number of serious disadvantages which accompany their use. It has been found, for example, that bolts with the wedge-shaped inserts are subject to severe internal stresses; those with the flat channel bottoms and U-shaped grooves break too easily under pressure; while others, with horizontally inclined channel bottoms which traverse the diameter of the shank either fully or partially, are difficult to work with in limited space, their being subject to having the elastic insert slip out if it is not carefully held in position while the nut is being screwed on. It has been likewise found that when subjected to severe or prolonged vibration while securing a heavy load, there occurs a certain amount of angular movement of the nut relative to the bolt due to the absence of adequate cushioning between the two and/or the existence of only a primary locking function of the one relative to the other.

These disadvantages are particularly unfavorable where the use of a nut and bolt combination demands a device that will be able to resist great shearing forces while subject to maximum strains of vibration and where the nut and bolt are in such a position as to prohibit on-the-spot repairs. Too, it is desirable that the unit be such that it may be dis-assembled and re-assembled a number of times without an appreciable decrease in the torque needed for such an operation. New and important fields of engineering, involving such areas as supersonic and interplanetary flight wherein the vibratory and load forces on securing devices are particularly great and where the repair of loosened or sheared bolts is impossible, particularly demand an easily assembled, high-strength, vibration-resistant, re-usable bolt, insert, and nut combination which will deliver as much locking strength as possible. Futhermore, space engineering entails frequent checking and adjusting before the vehicle leaves the ground, and thus such a device must be one which is capable of maintaining a stable assembling and dis-assembling torque. This use, of course, is not intended to limit the foreseeable applications of such a nut and bolt device but rather to point out only one instance in the wide and diversified area in which such a combination is needed either as a nut and bolt per se, as a stud-nut, or in any other instance which requires the fixing of a nut to a threaded object.

One object, therefore, of the present invention is to provide a nut, bolt, and insert arrangement wherein the nut is self-locking with respect to the bolt.

More specifically, this invention relates to a self-locking nut and bolt which is both capable of resisting over a million cycles of vibration in terms of angular displacement of the nut relative to the bolt, and because of its construction, is subjected to only minimal internal load stress.

Another object of the invention is to provide a self-locking nut and bolt which by virtue of the unique construction of its resilient bolt insert, exhibits a dual-locking effect and a markedly superior ability to absorb and minimize the effects of external vibrational impactual shock.

Still another object of the invention is to provide a self-locking nut, bolt, and resilient insert combination which is capable of being assembled and disassembled a number of times without any appreciable decrease in either the assembly or breakaway torques necessary for the operation.

Still another object of the invention is to provide a nut, bolt and resilient insert so constructed as to lend itself to simplified assembly especially important in limited spaces such as those which permit the use of only one hand. This is achieved by providing an insert which is both insertable after the nut has been started and which is so formed as to be self-centralizing while the nut is being turned to the desired position.

Still further objects and advantages of this invention will become evident from the following detailed description when considered in connection with the accompanying drawings, in which.

Figure 1:
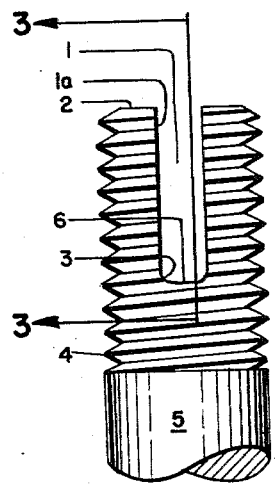
FIGURE 1 is an elevational view of the shank of the bolt having a part of the invention incorporated therein.

Referring now to the drawings, and in particular to FIGURE 1, numeral 5 represents a bolt in which the lateral boundaries 1a of U channel 1 run longitudinally down the threaded bolt shaft 2 and terminate in a flat bottom 6 which horizontally traverses bolt shaft 2 and which is characterized by the rounded corners 3. These rounded corners have been found to overcome a major difficulty presented by bolts with flat-bottomed, square-cornered channels, that is, the tendency to too readily break under pressure. This feature constitutes an important element of the instant invention since it renders the bolt subject to only minimal internal load stress and consequently adds to the strength of the locking implement.

In the present embodiment of the invention, the resilient insert 7 is preferably composed of nylon, plastic or aluminum but in use it may be made of any material, fibrous or homogeneous, which is softer than the nut and bolt, both of which in turn may consist of steel, iron, aluminum, brass, bronze, and so forth.

In its preferred shape, the insert has a head 8, shoulders 9, a relatively long side portion 10, a shorter side portion 11, and a bottom 12 which is canted so as to form a transverse angle 13 of preferably between 6–8° with the horizontal. The height of the insert along the line indicated at D may be slightly less than that of the bolt channel 1 so as to allow the placing of the insert after the nut 20 has been partially affixed. The length of the head 8 along line B is less than the inner root diameter of the threaded bolt shaft 2 in order that no appreciable torque is necessary to apply the nut to the first few bolt threads which surround the insert and also to provide a means whereby the insert is maintained in place and is rendered self-centralizing in the channel during the closing of the nut.

Figure 2:
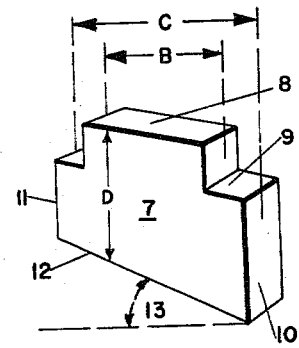
FIGURE 2 is a perspective view of the resilient insert.

The length of the insert at its widest point, between sides 10 and 11, as indicated by the letter C, FIGURE 2, is slightly wider than the outer diameter of the bolt threads 4 in order that the downward-moving nut may eventually form locking threads in the insert material and in order to provide the aforementioned cushioning effect which enables the invention to resist in excess of 1 million cycles of vibration with no loosening whatsoever.

Figure 3:
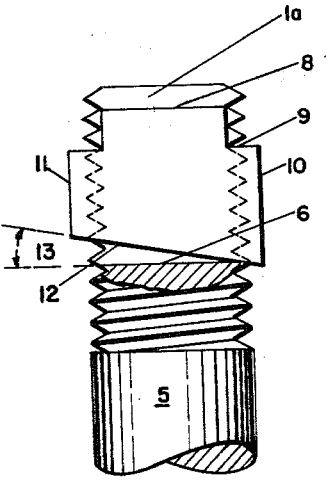
FIGURE 3 is a sectional view taken along line 3—3 of FIGURE 1 wherein the resilient element is in place.

In one mode of assembling the present invention, the insert 7 is placed in the bolt channel 1 as is depicted in FIGURE 3 so that the canted bottom 12 of the insert forms an angle of about 6–8° with the bolt channel bottom 6. A standard nut 20 is then applied to the bolt shank 2 and is screwed on far enough to contact the shoulders 9 of the insert so that the head 8 is encompassed by the inner threaded surface of the nut, thereby holding the insert in position. Subsequent tightening of the nut 20 gives rise to one of the following effects depending upon the length of the insert head 8 as indicated by the letter B, and upon the consistency of the material which comprises the insert. Substantially the same effect is had if the insert head is long enough to fully traverse the bolt channel and to fit snugly within the inner diameter of the nut and/or, if the insert is composed of a relatively soft, elastic material such as nylon or plastic. Likewise, a different type of locking action is effected if the insert head is substantially shorter than the bolt channel and does not approximate the nut threads and/or if the insert material is relatively hard and the non-elastic but softer than the nut and bolt, such as aluminum.

In the first case, employing an insert which has a relatively longer and snug fitting head 8 and/or which is of soft, elastic material, the following takes place. As the lower face 21 of the nut 20 contacts the shoulder 9 of the insert 7, the force of torque applied to the nut compresses the insert so that at first the bottom 12 of the insert on the long side 10 exerts certain downward pressure on channel bottom 6, which pressure, when it overcomes the resisting compressibility pressure of the insert, begins to compress the bottom 12 in the area of the long side 10, thus forcing the overhanging edge 14 of the insert bottom downwardly and forming the overhanging insert lip 15. This action has the effect of diminishing the angle 13 because of the forcing of the canted bottom 12 into the flat bottom 12a in the U channel bottom 6.

After the leveling off of the canted bottom of the insert, additional torque applied to the nut fully compresses the insert until at the point of maximum compressibility of the insert, nut threads 22 move into shoulder 9 of the insert to begin thread formation on the insert. The insert thread 25, since it is protruding laterally from the U channel a distance equal to that of the bolt threads 4 and since the downward compression of the insert has created a corresponding laterally directed force, interacts forcibly with the on-moving nut threads 22, thus creating the primary locking effect.

Figure 5:
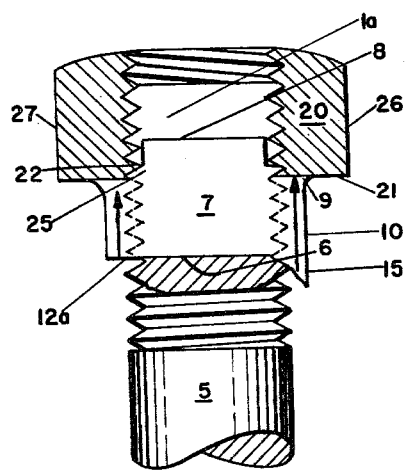

During the operation, the secondary locking effect of the instant invention has also begun to take place, and when the nut has reached the desired rest point, it will be readily seen, by referring to the vertical arrows in FIGURE 5 which represent force vectors, that the upward force exerted by the insert is greatest on the side of the overhanging lip 15, which side originally was the long side 10 of the insert. Because of the uneven upward force, the nut 20 is pushed slightly upward on nut side 26 thus canting the nut threads with respect to bolt threads and causing an increased friction on the interacting threads of that side and a resultant downward frictional force by nut side 27 which serves to secondarily lock the nut 20 firmly in place on both shaft and on the threaded insert.

In a second preferred embodiment of the invention employing an insert of hard material and/or having a shorter, loosely fitting head, the downward moving lower nut face 21 contacts the shoulders 9 of the insert and instead of immediate compression of the insert, the first force is manifested by a tilting of the insert which is permitted by the loosely fitting head. Short side 11 of the insert begins downward movement and insert bottom 12 becomes flush with the bolt channel 6. If the insert material here is elastic, slight compression has already begun of its long side 10. If, on the other hand, the insert is composed of a harder non-elastic material, thread-cutting is already beginning on long side 10 because of the on-moving threads 22 of the nut through the softer, but relatively non-compressible insert material.

Figure 4:
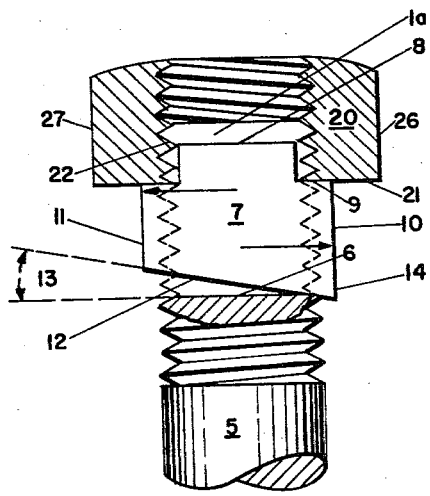
FIGURES 4 and 5 are side elevation views, partially in section, of the invention in which are shown succeeding phases in the assembly thereof.

In either instance, however, the locking action is predominantly the same. As the horizontal arrows in FIGURE 4 which represent force vectors indicate, the tilting tendency of this arrangement also gives rise to a secondary locking effect in addition to the primary locking action of the threading procedure. With the top of insert side 11 directed outward and the bottom of insert side 10 directed likewise, the nut 20 is again canted with respect to the bolt threads 4 and when the nut has reached its desired rest position, it is forcibly maintained in this relation.

Both of the above-described embodiments of the invention possess the advantages which I have outlined about, and although the present invention has been described and illustrated in great detail and in its preferred embodiments, it is to be clearly understood that various modifications of it may be made without departing from the spirit and scope of it.

Having thus described my invention, what I claim and seek to secure by Letters Patent is:

1. In a lock nut assembly, the combination of a threaded bolt having an axially extending slot, said slot traversing the screw from side to side and interrupting the threads thereof, said slot having parallel walls and a floor which is perpendicular to the longitudinal axis of the bolt, a nut adapted for threaded engagement with said bolt, a deformable T-shaped insert received in said bolt slot coaxial therewith, said T-shaped insert having a stem portion with a width only slightly less than that of the inner root diameter of the bolt threads and a head portion having side edges with a width slightly greater than the crest of said bolt threads, said stem lying within the confines of said thread root, said head portion having an inclined leading edge which when placed in operative position contacts the floor of said bolt slot at one edge thereof forming an axis of gyration and defining an acute angle therewith, and the side edges of said head portion lying generally parallel to the longitudinal axis of the bolt, said locking assembly further characterized in that when the nut is tightened over the stem portion of the insert and compresses said head portion, the walls thereof exert an unequal pressure against the nut which generates a turning moment about said axis of gyration thus creating an additional locking action.

2. The invention as defined in claim 1 wherein the insert is made of material selected from the group consisting of nylon, plastic and aluminum.

3. The invention is defined in claim 2 wherein the leading edge of said insert is angularly inclined in an amount of from about 5° to about 10° in relation to the horizontal axis of said head portion.

4. The invention as defined in claim 3 wherein the insert is shorter in height than said bolt slot.

5. The invention as defined in claim 1 wherein the axis of said slot coincides with that of said insert when in operative position.

6. The invention as defined in claim 1 further characterized in that the acute angle defined by the insert head and floor of the bolt slot is reduced when the nut is tightened onto the insert.

7. The invention as defined in claim 1 further characterized in that the center of gravity of said insert is displaced toward the floor of the bolt slot when the nut is tightened thereon.

8. The invention as defined in claim 1 wherein when said nut is tightened over said insert, threads are caused to be formed in the insert material, thereby locking said nut to said bolt.

References Cited by the Examiner

UNITED STATES PATENTS

| | | | |
|---|---|---|---|
| 291,328 | 1/84 | Garvey | 151—20 |
| 995,881 | 6/11 | Loop | 151—5 |
| 1,180,572 | 4/16 | Cox | 151—31 |
| 2,568,640 | 9/51 | Kindelberger | 151—7 |

EDWARD C. ALLEN, *Primary Examiner.*